(12) United States Patent
Espinoza et al.

(10) Patent No.: US 7,186,757 B2
(45) Date of Patent: Mar. 6, 2007

(54) SILICA-ALUMINA CATALYST SUPPORT WITH BIMODAL PORE DISTRIBUTION, CATALYSTS, METHODS OF MAKING AND USING SAME

(75) Inventors: Rafael L. Espinoza, Ponca City, OK (US); Kandaswamy Jothimurugesan, Ponca City, OK (US); Kevin L. Coy, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 181 days.

(21) Appl. No.: 10/964,988

(22) Filed: Oct. 14, 2004

(65) Prior Publication Data

US 2005/0107479 A1    May 19, 2005

Related U.S. Application Data

(60) Provisional application No. 60/511,995, filed on Oct. 16, 2003.

(51) Int. Cl.
C07C 27/00 (2006.01)
(52) U.S. Cl. ........................ 518/715; 518/700
(58) Field of Classification Search .............. 518/700, 518/715
See application file for complete search history.

(56) References Cited

U.S. PATENT DOCUMENTS

| | | | |
|---|---|---|---|
| 2,892,858 A | 6/1959 | Ziegler | |
| 3,852,190 A | 12/1974 | Buss et al. | |
| 3,894,963 A | 7/1975 | Gerdes et al. | |
| 4,012,313 A | 3/1977 | Buss et al. | |
| 4,063,851 A | 12/1977 | Weldon | |
| 4,224,192 A | 9/1980 | Foster et al. | |
| 4,387,085 A | 6/1983 | Fanelli et al. | |
| 4,602,000 A | 7/1986 | Dupin et al. | |
| 4,617,183 A | 10/1986 | Lewis et al. | |
| 4,708,945 A | 11/1987 | Murrell et al. | |
| 4,744,974 A | 5/1988 | Lewis et al. | |
| 4,831,007 A | 5/1989 | Murrell et al. | |
| 4,891,127 A | 1/1990 | Murrel et al. | |
| 5,055,019 A | 10/1991 | Meyer et al. | |
| 5,102,851 A | 4/1992 | Eri et al. | |
| 5,116,879 A | 5/1992 | Eri et al. | |
| 5,134,107 A | 7/1992 | Narula | |
| 5,232,580 A | 8/1993 | Le et al. | |
| 5,837,634 A | 11/1998 | McLaughlin et al. | |
| 5,874,381 A | 2/1999 | Bonne et al. | |
| 6,063,358 A | 5/2000 | Lindquist et al. | |
| 6,224,846 B1 | 5/2001 | Hurlburt et al. | |
| 6,255,358 B1 | 7/2001 | Singleton et al. | |
| 6,262,132 B1 | 7/2001 | Singleton et al. | |
| 6,271,432 B2 | 8/2001 | Singleton et al. | |
| 6,303,531 B1 | 10/2001 | Lussier et al. | |
| 6,465,530 B2 | 10/2002 | Roy-Auberger et al. | |
| 6,503,867 B1 | 1/2003 | Stamires et al. | |
| 6,555,496 B1 | 4/2003 | Stamires et al. | |
| 6,806,226 B2 | 10/2004 | Van Berge et al. | |
| 6,835,690 B2 | 12/2004 | Van Berge et al. | |
| 2002/0155946 A1 | 10/2002 | Bogdan et al. | |
| 2002/0192155 A1 | 12/2002 | Sterte et al. | |
| 2003/0027875 A1 | 2/2003 | Zhang et al. | |
| 2003/0032554 A1 | 2/2003 | Park et al. | |
| 2003/0114543 A1 | 6/2003 | Zhang et al. | |
| 2003/0162849 A1 | 8/2003 | Van Berge et al. | |
| 2004/0186188 A1 | 9/2004 | Van Berge et al. | |

FOREIGN PATENT DOCUMENTS

| | | |
|---|---|---|
| GB | 640965 | 8/1950 |
| GB | 2 352 194 A | 1/2001 |
| WO | WO 99/42214 | 8/1999 |
| WO | WO 00/45948 | 8/2000 |
| WO | WO 01/76735 A1 | 10/2001 |
| WO | WO 01/87480 A1 | 11/2001 |
| WO | WO 02/07883 A2 | 1/2002 |
| WO | WO 03/012008 A2 | 2/2003 |
| ZA | 2001/6213 | 7/2001 |

OTHER PUBLICATIONS

PCT International Preliminary Report on Patentability For International Application PCT/US04/34414 dated Apr. 18, 2006 (4 pg.).
Snel, R. "Control of the porous structure of amorphous silica-alumina: 4. Nitrogen bases as pore-regulating agents" Applied Catalysis, vol. 33 (Issue 2), p. 281-294 (1987).
Snel, R. "Control of the porous structure of amorphous silica-alumina 3. The influence of pore-regulating reagents" Applied Catalysis, vol. 12 (2), p. 347-357 (1984).
Snel, R. "Control of the porous structure of amorphous silica-alumina 2. The effects of ph and reactant concentration" Applied Catalysis, vol. 12 (2), p. 189-200 (1984).
Zhang, Y. et al "Development of bimodal cobalt catalysts for Fischer-Tropsch synthesis" Catalysis Today, vol. 93-95, p. 55-63 (Sep. 2004).
Takahashi R., et al "Silica-Alumina Catalyst with Bimodal Pore Structure Prepared by Phase Separation in Sol-Gel Process" J. of Catalysis, vol. 200 (1), p. 197-202 (2001).
Rong-Sheng Zhou, et al.; "Structures and Transformation Mechanisms of the η, γ and η Transition Aluminas"; International Union of Crystallography 1991; Institute for Ceraminc Superconductivity, New York State College of Ceramics, Alfred University, Alfred, NY 14802, USA; pp. 617-630.

(Continued)

Primary Examiner—J. Parsa
(74) Attorney, Agent, or Firm—Conley Rose P.C.

(57) ABSTRACT

An effective catalyst includes an amorphous silica-alumina support having a bimodal pore size-distribution. The support may be prepared by a method that includes the physical mixing of two silica-alumina gels prepared so as to have two different average pore sizes. The catalyst has the advantage that both metal dispersion on the support and product diffusion in the pores are optimized. Further, the catalyst has improved performance in the production of hydrocarbons from synthesis gas.

30 Claims, 1 Drawing Sheet

OTHER PUBLICATIONS

Richard L. Smith, et al.; "The Influence of Diaspore Seeding and Chlordie Concentration on the Transformation of 'Diasporic' Precursors to Corundum"; Journal of the American Ceramic Society, Oct. 16, 2000; 31 pages.

H.C. Stumpf, et al.; "Thermal Transformations of Aluminas and Alumina Hydrates"; Industrial and Engineering Chemistry, vol. 42, No. 7, Jul. 1950; pp. 1398-1403.

Shu-Hui Cai, et al.; "Atomic Scale Mechanism of the Transformation of γ-Alumina to θ-Alumina"; The American Physical Society 2002; Physical Review Letters, vol. 89, No. 23; Dec. 2, 2002; 4 pages.

Zhong-Wen Liu, et al.; "Partial Oxidation of Methane Over Nickel Catalysts Supported on Various Aluminas"; Korean J. Chem. Eng., vol. 19, No. 5, pp. 735-741 (2002).

Hyun-Seog Roh, et al.; "Partial Oxidation of Methane Over Ni/η-$Al_2O_3$Catalysts"; Chemistry Letters 2001; Mar. 19, 2001; pp. 666-667.

Hyun-Seog Roh, et al.; "Partial Oxidation of Methane Over Ni/Ce-$ZrO_2$/η-$Al_2O_3$"; Korean J. CHem. Eng., vol. 19, No. 5; pp. 742-748 (2002).

Hiromichi Arai, et al.; "Thermal stabilization of catalysts supports and their application to high-temperature catalytic combustion"; Applied Catalysis A: General 138 (1996); pp. 161-176; Elsevier Science Publishers B.V., Amsterdam.

Bernard Beguin et al.; "Stabilization of alumina by addition of lanthanum"; Applied Catalysis A: General 75 (1991); pp. 119-132; Elsevier Science Publishers B.V., Amsterdam.

Francois Oudet, et al.; "Thermal Stabilization of Transition Alumina by Structural Coherence with LnAlO3 (Ln=La, Pr, Nd)"; Journal of Catalysts vol. 114; pp. 112-120 (1988).

H. Schaper, et al.; "The Influence of Lanthanum Oxide on the Thermal Stability of Gamma Alumina Catalyst Supports"; Applied Catlysis, vol. 7 (1983), pp. 211-220; Elsevier Science Publishers B.V., Amsterdam.

Jalajakumari Nair, et al.; "Pore Structure Evolution of Lanthana-Alumina Systems Prepared Through Coprecipitation"; J. Am Ceram. Soc., vol. 83, No. 8; pp. 1942-1946 (2000).

Hennie Schaper, et al.; "Thermal Stabilization of High Surface Area Lumina"; Solid State Ionics, vol. 16 (1985), pp. 261-265.

Xiaoyin Chen, et al.; "High temperature stabilization of alumina modified b lanthanum species"; Applied Catalysis A: General, vol. 205 (2001); pp. 159-172.

S. Subramanian, et al.; "Characterization of lanthana/alumina composite oxides"; Journal of Molecular Catalysis, vol. 69 (1991); pp. 235-245.

P. Souza Santos, et al.; "Standard Transition Aluminas. Electron Microscopy Studies"; Materials Resarch, vol. 3, No. 4; pp. 104-114, 2000.

E. Iglesia, et al.; "Computer-Aided Design of Catalysts," ed. E.R. Becker et al., p. 215-225, New York, Marcel Decker, Inc., 1993.

H. Pham, et al.; "The synthesis of attrition resistant slurry phase iron Fischer-Tropsch catalysts," Catalysis Today, vol. 58 (2000), pp. 233-240.

Database CAPLUS on STN, Chemical Abstract (Columbus, Ohio, USA), An 2000:795147. Van De Loosdrecht et al., *Support Modification for Cobalt Based Slurry Phase Fischer-Tropsch Catalysts*, American Chemical Society (2000), 220th, Fuel 048.

M. Absi-Halabi, et al.; "Studies on Pore Size Control of Alumina: Preparation of Alumina Catalyst Extrudates with Large Unimodal Pore Structure by Low Temperature Hydrothermal Treatment"; Preparation of Catalysts V, 1991 Elsevier Science Publishers B.V., Amsterdam, pp. 155-163.

Database CAPLUS on STN, Wei et al. *Microstructure of Al203-Si02 Composite Membranes Prepared by Sol-gel Technique*, Guisuanyan Zuebao (2001), 29(4), 392-396.

PCt International Search Report International Application No. PCT/US04/34414 dated Jan. 5, 2005 (2 p.)

Ruud Snel, *Control of the Porous Structure of Amorphous Silica-Alumina*, Applied Catalysis, 11 (1984) 271-280.

R. L. Espinoza et al., *Catalytic Oligomerization of Ethene Over Nickel-Exchanged Amorphous Silica-Aluminas; Effect of the Acid Strength of the Support*, Applied Catalysis, 29 (1987) 295-303.

SILICA-ALUMINA CATALYST SUPPORT WITH BIMODAL PORE DISTRIBUTION, CATALYSTS, METHODS OF MAKING AND USING SAME

CROSS-REFERENCE TO RELATED APPLICATIONS

This non-provisional application claims the benefit of U.S. provisional application No. 60/511,995, filed Oct. 16, 2003, which is hereby incorporated by reference in its entirety.

FIELD OF THE INVENTION

The present invention relates generally to a catalyst that includes an amorphous silica-alumina having a bimodal pore size-distribution. Further, the present invention relates to a method of making the bimodal amorphous silica-alumina by mixing a first gel having a first average pore size with a second gel having a second average pore size. Still further, the present invention relates to the use of the catalyst in a process for producing hydrocarbons.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it, which contributes to the final cost of the natural gas.

Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require energy, equipment, and the expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen to form syngas, which is a combination of carbon monoxide gas and hydrogen gas. In the second transformation, known as the Fischer-Tropsch process, carbon monoxide is converted into organic molecules containing carbon and hydrogen. Those organic molecules containing only carbon and hydrogen are known as hydrocarbons. In addition, other organic molecules containing oxygen in addition to carbon and hydrogen, known as oxygenates, may be formed during the Fischer-Tropsch process. Hydrocarbons having carbons linked in a straight chain are known as aliphatic hydrocarbons that may include paraffins and/or olefins. Paraffins are particularly desirable as the basis of synthetic diesel fuel.

Typically the Fischer-Tropsch product stream contains hydrocarbons having a range of numbers of carbon atoms and thus having a range of molecular weights. Therefore, the Fischer-Tropsch products produced by conversion of natural gas commonly contain a range of hydrocarbons including gases, liquids and waxes. Depending on the product molecular weight distribution, different Fischer-Tropsch product mixtures are ideally suited to different uses. For example, Fischer-Tropsch product mixtures containing liquids may be processed to yield gasoline, as well as middle distillates. Hydrocarbon waxes may be subjected to an additional processing step for conversion to liquid and/or gaseous hydrocarbons. Consequently, in the production of a Fischer-Tropsch product stream for processing to a fuel it is desirable to maximize the production of high value liquid hydrocarbons, such as hydrocarbons with at least 5 carbon atoms per hydrocarbon molecule ($C_{5+}$ hydrocarbons).

The Fischer-Tropsch process is commonly facilitated by a catalyst. Catalysts desirably have the function of increasing the rate of a reaction without being consumed by the reaction. The composition of a catalyst influences the relative amounts of hydrocarbons obtained from a Fischer-Tropsch catalytic process. Common catalysts for use in the Fischer-Tropsch process contain at least one metal from Groups 8, 9, or 10 of the Periodic Table (in the new IUPAC notation, which is used throughout the present specification). Cobalt metal is particularly desirable in catalysts used in converting natural gas to heavy hydrocarbons suitable for the production of diesel fuel. Alternatively, iron, nickel, and ruthenium have been used in Fischer-Tropsch catalysts. Nickel catalysts favor termination and are useful for aiding the selective production of methane from syngas. Iron has the advantage of being readily available and relatively inexpensive but the disadvantage of a water-gas shift activity. Ruthenium has the advantage of high activity but is quite expensive.

In addition to the catalytic metal, a Fischer-Tropsch catalyst often includes a support material. In a common method of depositing catalyst metal on a support, the support is impregnated with a solution containing a dissolved metal precursor compound and is thereafter dried. Catalyst supports for catalysts used in Fischer-Tropsch synthesis of hydrocarbons have typically been refractory oxides (e.g., silica, alumina, titania, thoria, zirconia or mixtures thereof). It has been claimed that the Fischer-Tropsch synthesis reaction is only weakly dependent on the chemical identity of the metal oxide support (see E. Iglesia et al. 1993, In: "Computer-Aided Design of Catalysts," ed. E. R. Becker et al., p. 215, New York, Marcel Dekker, Inc.).

Dispersion of the catalytic metal on a support tends to influence the performance of a supported catalyst. Lower dispersion does not fully utilize metal sites and is not an efficient use of the available metal. In contrast, high dispersion of catalytic metal more fully utilizes metal sites and results in a higher initial catalyst activity, such as carbon monoxide conversion in the Fischer-Tropsch reaction. However, highly dispersed metal tends to be more difficult to reduce and tends to deactivate more rapidly.

Thus, it is desirable to control the dispersion of metal for supported metal catalysts. Methods for controlling dispersion typically involve a modification of the method of depositing metal on the support. For example, methods of affecting the dispersion of a catalytic metal include controlling the evaporation rate of a solvent (e.g., water) used to impregnate a support with a metal precursor (e.g., nitrates or acetates of Fe, Co, Ru, and the like), for example by varying the temperature or pressure. Other techniques for adjusting dispersion include using solvents with higher or lower boiling points than water. Further, chemical vapor deposition is a well-known technique for controlling the final dispersion of metal.

Consequently, there remains a need for supported Fischer-Tropsch catalysts having improved dispersion of catalytic metal and methods of making such catalysts.

SUMMARY OF THE INVENTION

The present invention provides a supported silica-alumina catalyst having a bimodal pore size-distribution. The present inventors have discovered that, for a catalyst comprising a catalytic metal and an amorphous silica-alumina support with a desirable average pore size, there is a direct correlation between the catalytic metal dispersion and the molar ratio of silica to alumina, which indicates that the average size of catalytic metal crystallites on the support can be controlled by the silica-to-alumina molar ratio of the support and not be limited by the average pore size of the support. This correlation was observed in supports made by a precipitation method. The desirable average pore size of the support can be obtained by varying the gelation pH according to the silica alumina ratio. The present inventors have further discovered that mixing two silica-alumina gels having a different average pore size produces a support having a bimodal pore size-distribution. The two silica-alumina gels may have similar or different silica-to-alumina ratios. The Applicants believe that the present support has the advantage of having a first mode of pore sizes optimized for metal crystallite size and dispersion, and a second mode of pore sizes optimized for product diffusion. The first mode and second mode preferably differ by at least 2 nanometers (nm). The amorphous silica-alumina support may have a surface area and pore volume greater than about 260 m$^2$/g and about 0.7 cc/g, respectively.

The present support, method of making the support, catalyst, and process for producing hydrocarbons have the advantage that the dispersion of catalytic metal and product diffusion can be optimized by controlling the distribution of pore volume.

In a preferred embodiment, the support has pores with sizes ranging from about 4 nm to about 20 nm. The pores are distributed in a first range with an average pore size ranging from about 4 nm to about 10 nm and in a second range of pores with an average pore size ranging from about 10 nm to about 20 nm. The first range of pores preferably comprises the first mode and includes from about 70% to about 90% of the pores. The second range of pores preferably comprises the second mode and includes from about 10% to about 30% of the pores. The amorphous silica-alumina bimodal support comprises a first mode preferably between about 4 nm and about 10 nm, more preferably between about 5 nm and about 9 nm; and a second mode preferably between about 10 nm and about 20 nm, more preferably between about 12 nm and about 17 nm.

According to a preferred embodiment of the present invention, a method of making the bimodal silica-alumina support comprises mixing two silica-alumina gels comprising different average pore sizes; and treating said gel mixture to form the bimodal silica-alumina support. The two silica-alumina gels may have the same or different silica-to-alumina molar ratios. Each gel is preferably prepared by the co-precipitation of a silicon basic source and a basic aluminum source with an acid at a gelation pH, wherein the gelation pH is preferably adjusted so as to provide a desirable average pore size. Each average pore size from the two gels becomes one mode of the two modes in the bimodal silica-alumina support. The treating may comprise contacting with an ion-exchange solution and washing with a wash solution, especially when one (or both) of the basic silicon and aluminum sources comprises sodium. Treating preferably includes aging, drying and calcining the gel mixture.

According to a preferred embodiment of the present invention, a catalyst includes a Fischer-Tropsch metal and the present support.

According to another preferred embodiment of the present invention, a process for producing hydrocarbons includes contacting synthesis gas with a catalyst that includes the present support.

Thus, each of the preferred embodiments of the present invention comprises a combination of features and advantages, which enable it to overcome various problems of typical catalysts and processes. The various characteristics described above, as well as other features, will be readily apparent to those skilled in the art upon reading the following detailed description of the preferred embodiments of the invention and by referring to the accompanying drawing.

BRIEF DESCRIPTION OF THE DRAWINGS

For a more detailed description of the preferred embodiment of the present invention, reference will now be made to the accompanying drawing, wherein the drawing illustrates a plot of pore size distribution for a bimodal support according to an embodiment of the present invention.

DETAILED DESCRIPTION OF THE PREFERRED EMBODIMENT

According to an embodiment of the present invention, it has been discovered that an effective catalyst includes an amorphous silica-alumina support that has a bimodal pore size-distribution.

As used herein and throughout the specification, a bimodal pore size-distribution is defined as a pore size-distribution in which, when incremental pore volume is plotted as a function of pore size (or diameter), the resulting function exhibits two maxima, also referred to as modes herein.

The amorphous silica-alumina with a bimodal pore size-distribution is prepared by the physical mixing of a first gel with a first silica-to-alumina ratio prepared so as to achieve a first average pore size and of a second gel with a second silica-to-alumina ratio prepared so as to achieve a second average pore size. The second silica-to-alumina ratio may be the same or different than the first silica-to-alumina ratio. When the two gels are combined by physical mixing and treated, the first average pore size becomes the first mode of the bimodal pore size-distribution, and the second average pore size becomes the second mode of the bimodal pore size-distribution.

By way of example and not limitation, a method of preparing an amorphous silica-alumina support with a bimodal pore size-distribution may include co-precipitating a basic aluminum source and a basic silicon source with the addition of acid so as to form a gel. The basic aluminum source is preferably sodium aluminate. Other suitable basic aluminum sources include aluminum hydroxide and the like. The basic silicon source is preferably sodium silicate. The acid is preferably nitric acid. Other suitable acids include acetic acid, formic acid, and the like.

Further, the amorphous silica-alumina support preferably is made by a precipitation method, which comprises (a) mixing a basic silicon source and a basic aluminum source so as to form a first sol corresponding to a first silica-to-alumina molar ratio; (b) adding an acid to said first sol to form a first gel and to adjust the gelation pH of the first gel so as to obtain a first average pore size of the first gel; (c) mixing a basic silicon source and a basic aluminum source so as to form a second sol corresponding to a second silica-to-alumina molar ratio; (d) adding an acid to said second sol to form a second gel and to adjust the gelation pH of the second gel so as to obtain a second average pore size of the second gel; (e) mixing a portion of the first gel and a portion of the second gel to form a gel mixture; and (f) treating said gel mixture so as to form the amorphous silica-alumina bimodal support comprising a first mode and a second mode. The second average pore size preferably differs by at least about 2 nm from the first average pore size. The first average pore size becomes the first mode of the support, and the second average pore size becomes the second mode of the support. The first and the second silica-to-alumina molar ratios may be the same or different. The basic silicon source and the basic aluminum source in step (c) are preferably the same as in step (a). Step (d) is performed in a manner such that the second gelation pH of the second gel is greater than the first gelation pH of the first gel adjusted in step (b) so as to achieve a difference of at least about 2 nm in the first and second average pore sizes of the two silica-alumina gels.

A gel according to a preferred embodiment includes an amorphous silica-alumina gel with a preselected silica-to-alumina molar ratio. The silica-to-alumina molar ratio is preferably from about 3:1 to about 1,000:1, more preferably between about 30:1 and about 500:1, still more preferably between about 40:1 and about 400:1. While not wishing to be limited theory, the present Applicants believe that the dispersion of the catalytic metal on the silica-alumina support is controlled by adjusting the availability of aluminum species. It is theorized that these aluminum-comprising sites (most likely the acid Si—O—Al sites) guide the initial deposition of catalytic metal species onto these sites so as to subsequently form metal crystallites. Therefore, for a given pore structure, the catalytic metal-to-alumina molar ratio (or the silica-to-alumina molar ratio for a given catalytic metal loading) influences the average crystallite size and thus the dispersion of the catalytic metal.

Consequently, the Applicants can create two silica-alumina precursors (in the form of gels) with different average pore sizes using this technique and can combine these support precursors so as to obtain an amorphous bimodal silica-alumina support (i.e., with two pore volume maxima within the pore size range) to obtain an optimized pore size-distribution, wherein this bimodal silica-alumina support has a suitable silica-to-alumina ratio to obtain a desirable catalytic metal dispersion.

The present inventors have found that, in the absence of adjustment of the gelation pH in the formation of an amorphous silica-alumina support, the dispersion of metal deposited on the support to form a catalyst depends not only on the molar ratio of silica to alumina but also on the porous structure of the amorphous silica-alumina.

For amorphous silica-alumina materials formed with a given pH (wherein said selection is independent of the silica-to-alumina molar ratio), the porous structure of these amorphous silica-alumina materials varies with their corresponding silica-to-alumina ratios. Typically, as the preselected silica-to-alumina ratio increases for a given pH, the average pore size of the silica-alumina support also increases. However, it is quite desirable to select a suitable average pore size and be able to obtain this suitable average pore size for the amorphous silica-alumina regardless of the preselected silica-to-alumina molar ratio. Therefore, to achieve the desirable porous structure for a preselected silica-to-alumina ratio, the gelation pH can be adjusted during the formation of an amorphous silica-alumina. As an illustration, for a preselected silica-to-alumina molar ratio, a decrease in the gelation pH may decrease the same average pore size of the amorphous silica-alumina material. Thus, the present inventors have found that the average pore size of a silica-alumina amorphous support can be controlled by adjusting the gelation pH during the formation of the silica-alumina gel.

The steps (b) and (d) in the method include selecting the gelation pH according to the desired average pore size of one silica-alumina gel with a given silica-to-alumina molar ratio. The adjustment of the gelation pH for both gels containing the same silica-to-alumina molar ratio to distinct pH values is a step that can allow a bimodal pore size-distribution in the resulting silica-alumina material. Further, the gelation pH is preferably selected according to the relationship pH=a+b ln (SAR), in which pH is the gelation pH and SAR is the silica-to-alumina molar ratio. The intercept a and the slope b are preferably selected so as to control the porous structure of the silica-alumina material. For example, if it is desirable to obtain a porous structure of the silica-alumina material with an average pore size of 8 nanometers, the pH is selected such that the intercept a is equal to −0.1522, and the slope b is equal to 11.295. This pH adjustment to control average pore size of each gel is a modification of conventional precipitation preparation methods. For example, a method of preparing an amorphous silica-alumina is described in R. Snel, "Control of the Porous Structure of Amorphous Silica-Alumina I. The Effects of Sodium Ions and Syneresis", Applied Catalysis 11, pp. 271–280 (1984), incorporated herein by reference to the extent that it discloses such methods. Suitable alternative conventional precipitation methods are contemplated as long as the same silica-to-alumina molar ratio is selected for both silica-alumina precursors and as along as one can modify the average pore size of each silica-alumina precursor without affecting the desired silica-to-alumina molar ratio.

The silica-alumina may be selected from among high acidity silica-alumina (HASA), medium acidity silica-alumina (MASA), and low acidity silica-alumina (LASA). The silica-alumina preferably is a low acidity silica-alumina.

The silica-alumina gel preferably has an acidity index greater than about 6 and less than about 129. The acidity index preferably is determined according to the procedure described in R. L. Espinoza, et al. "Catalytic Oligimerization of Ethene over Nickel-Exchanged Amorphous Silica-Alumina: Effect of the Acid Strength of the Support," Applied Catalysis 29, pp. 295–303 (1987), incorporated herein by reference to the extent that it discloses such methods. In particular, the procedure involves the use of the support to catalyze the conversion of methanol to hydrocarbons via a dimethylether intermediate. The acidity index is determined according to the formula:

Acidity index=% conversion to DME+20·(% conversion to hydrocarbons)

Alternatively, other suitable methods of determining acidity are contemplated. When other methods are used, the silica-alumina preferably has an acidity index greater than that of titania-zirconia and less than that of a typical medium acidity silica-alumina.

Preferably, the acid is added until a desired gelation pH is attained. When the silica/alumina ratio is between about 3:1 and about 1,000:1, the gelation pH is preferably greater than about 10 and more preferably between about 10 and about 11, which allows the formation of a gel. The average pore size of the silica-alumina gel is quite sensitive to the gelation pH, and very small pH changes may lead to significant changes in the average pore size. As an example, for a silica-to-alumina molar ratio of 70:1, a gelation pH of 11.00 may result in an average pore size of 14 nm, whereas a gelation pH of 10.67 may result in an average pore size of 8 nm.

The selection of the gelation pH suitable for obtaining a pore size of an amorphous silica-alumina is disclosed in co-owned, co-pending patent application Ser. No. 10/962,702 which is entitled "Silica-alumina catalyst support, catalysts made therefrom and methods of making and using same", which is incorporated herein by reference in its entirety.

A first gel has an average pore size within a first range. The first range preferably comprises an average pore size preferably between about 4 nm and about 10 nm. A second gel has an average pore size within a second range. The second range preferably comprises an average pore size between about 10 nm and about 20 nm.

A gel mixture is produced in step (e) by a physical mixing of a portion of the first gel and a portion of the second gel. The mixing is done in a manner effective to achieve the desired proportions of the first range and second range of pore sizes. Preferably, the portion of the first gel comprises from about 70% to about 90% by weight of the final gel mixture weight, so that the bimodal silica-alumina material comprises from about 70% to about 90% of the pores sizes between about 4 nm and about 10 nm. Preferably, the portion of the second gel comprises from about 10% to about 30% by weight of the final gel mixture weight, so that the bimodal silica-alumina material comprises from about 10% to about 30% of the pore sizes between about 10 nm and about 20 nm.

Treating in step (f) comprises aging the gel mixture, preferably for between about 0.5 hour and about 72 hours, more preferably between about 0.5 hour and about 12 hours. The aging preferably occurs at room or ambient temperature.

When either (or both) of the silicon basic source and the aluminum basic source comprises sodium, treating in step (f) preferably comprises contacting the aged gel mixture with an ion-exchange solution; and washing the ion-exchanged gel mixture with a wash liquid. The ion-exchange solution has a sufficient concentration of alternate cations to substitute the sodium cations derived from the silicon and/or aluminum sources. The contacting may be performed for a sufficient amount of time so as to exchange substantially all of the sodium cations by the alternate cations present in the ion-exchange solution. The ion-exchange solution comprises preferably ammonium nitrate, ammonium carbonate, or combination thereof. The washing step may be done after the contact with the ion-exchange solution is complete and may be effective to remove the majority of the spent ion-exchange solution, which comprises the sodium cations. The wash liquid is preferably water.

Treating in step (f) further comprises drying the gel preferably for between about 1 and about 48 hours, more preferably from about 5 to about 24 hours. The drying preferably occurs at a temperature between about 80° C. and about 130° C. at a pressure between about 0 and about 10 atm, more preferably between about 1 atm and about 5 atm, still more preferably at about 1 atm. The drying preferably includes heating the gel mixture in an atmosphere of air.

Treating in step (f) further comprises calcining the gel mixture for a period of time sufficient to transform silicate and aluminate species to silica and alumina, preferably between about 0.5 and about 24 hours, more preferably between about 1 and about 10 hours. The calcination preferably occurs at a temperature between about 230° C. and about 800° C., more preferably between about 400° C. and about 600° C., at a pressure between about 0 and about 10 atm, more preferably between about 1 atm and about 5 atm, still more preferably at about 1 atm. The calcination preferably includes heating the gel mixture in an oxidizing atmosphere, such as air or other suitable oxygen-containing gas.

The resulting support preferably has a surface area of at least about 260 square meters per gram of support ($m^2/g$), more preferably greater than about 300 $m^2/g$. Further, the support preferably has a pore volume of at least about 0.7 cubic centimeters per gram of support (cc/g). In addition, at least about 0.7 cc/g of the pore volume is preferably concentrated in pores having a diameter from about 4 nm to about 20 nm. From about 70% to about 90% of the from about 4 nm to about 20 nm pores preferably have a first mode from about 4 nm to about 10 nm, more preferably from about 5 nm to about 9 nm. From about 10% to about 30% of the from about 4 nm to about 20 nm pores have a second mode of from about 10 nm to about 20 nm, more preferably from about 12 nm to about 17 nm. The pore volume in pores having a diameter less than about 4 m is preferably less than about 0.05 cc/g. In some embodiments, the first mode and the second mode differ by at least about 2 nm.

Catalyst Composition

The present catalyst preferably includes a catalytic metal and optionally at least one promoter. The catalytic metal is preferably a Fischer-Tropsch catalytic metal. In particular, the catalytic metal is preferably selected from among the Group 8 metals such as iron (Fe), ruthenium (Ru), and osmium (Os); Group 9 metals such as cobalt (Co), rhodium (Rh), and iridium (Ir); Group 10 elements such as nickel (Ni), palladium (Pd), and platinum (Pt), and the metals molybdenum (Mo), rhenium (Re), and tungsten (W). The catalytic metal is more preferably selected from group of metals consisting of cobalt, iron, ruthenium, nickel, and combinations thereof. The catalytic metal still more preferably is selected from cobalt, iron, ruthenium, and combinations thereof. The catalytic metal is most preferably cobalt. The catalyst preferably contains a catalytically effective amount of the catalytic metal. The amount of catalytic metal present in the catalyst may vary widely.

When the catalytic metal is cobalt, the catalyst preferably has a nominal composition that includes cobalt in an amount totaling from about 1% to about 50% cobalt by weight (as the metal) of total catalyst composition (catalytic metal, support, and any optional promoters), more preferably from about 5% to about 40% cobalt by weight, still more preferably from about 10 to about 37 wt. % cobalt, still yet more preferably from about 15 to about 35 wt. % cobalt. It will be understood that % indicates percent and that wt. % indicates percent by weight throughout the present specification.

When the catalytic metal is iron, the catalyst preferably has a nominal composition including from about 5 to about 75% iron by weight of total catalyst composition, preferably from about 10 to about 60 wt. % iron, more preferably from about 20 to about 50 wt. % iron.

Alternatively, when the catalytic metal is ruthenium, the catalyst preferably has a nominal composition including from about 0.01 to about 5% by weight of total catalyst composition, preferably from about 0.5 to about 4 wt. % ruthenium, more preferably from about 1 to about 3 wt. % ruthenium.

It will be understood that, when the catalyst includes more than one supported metal, the catalytic metal, as termed herein, is the primary supported metal present in the catalyst. The primary supported metal is preferably determined by weight, which is determined by the primary supported metal preferably present in the greatest % by weight.

The catalytic metal contained by a catalyst according to a preferred embodiment of the present invention is preferably in a reduced, metallic state before use of the catalyst in the Fischer-Tropsch synthesis. However, it will be understood that the catalytic metal may be present in the form of a metal compound, such as a metal oxide, a metal hydroxide, and the like. The catalytic metal is preferably uniformly dispersed throughout the support. It is also understood that the catalytic metal can also be present at the surface of the support, in particular on the surface or within a surface region of the support, or that the catalytic metal can be non-homogeneously dispersed onto the support.

Optionally, the present catalyst may also include at least one promoter known to those skilled in the art. Suitable promoters vary with the catalytic metal. A promoter may also be an element that, in an active form, has catalytic activity, in the absence of the catalytic metal. Such an element will be termed herein a promoter when it is present in the catalyst in a lesser wt. % than the catalytic metal.

A promoter preferably enhances the performance of the catalyst. Suitable measures of the performance that may be enhanced include product selectivity, reactant conversion, stability, lifetime, reducibility and resistance to potential poisoning by impurities such as sulfur, nitrogen, and oxygen. A promoter is preferably a Fischer-Tropsch promoter, which is an element or compound that enhances the performance of a Fischer-Tropsch catalyst in a Fischer-Tropsch process.

It will be understood that, as contemplated herein, an enhanced performance of a promoted catalyst may be calculated according to any suitable method known to one of ordinary skill in the art. In particular, an enhanced performance may be given as a percent and computed as the ratio of the performance difference to the performance of a reference catalyst. The performance difference is between the performance of the promoted catalyst and the reference catalyst, in which the reference catalyst is a similar corresponding catalyst having the nominally same amounts, e.g. by weight percent, of all components except the promoter. It will further be understood that, as contemplated herein, a performance may be measured in any suitable units. For example, when the performance is the productivity, the productivity may be measured in grams product per hour per liter reactor volume, grams product per hour per kilogram catalyst, and the like.

Suitable promoters vary with the catalytic metal and may be selected from Groups 1–15 of the Periodic Table of the Elements. A promoter may be in elemental form. Alternatively, a promoter may be present in an oxide compound. Further, a promoter may be present in an alloy containing the catalytic metal. Except as otherwise specified herein, a promoter is preferably present in an amount to provide a weight ratio of elemental promoter: elemental catalytic metal of from about 0.00005:1 to about 0.5:1, preferably from about 0.0005:1 to about 0.25:1 (dry basis). When the promoter comprises a metal from Groups 7, 8, 9, and 10 of the Periodic Table, such as rhenium, ruthenium, platinum, or palladium, the weight ratio of elemental promoter: elemental catalytic metal is preferably between about 0.00005:1 and about 0.05:1.

When the catalytic metal is cobalt, suitable promoters include Group 1 elements such as potassium (K), lithium (Li), sodium (Na), and cesium (Cs); Group 2 elements such as calcium (Ca), magnesium (Mg), strontium (Sr), and barium (Ba); Group 3 elements such as scandium (Sc), yttrium (Y), and lanthanum (La); Group 4 elements such as (titanium) (Ti), zirconium (Zr), and hafnium (Hf); Group 5 elements such as vanadium (V), niobium (Nb), and tantalum (Ta); Group 6 elements such as molybdenum (Mo) and tungsten (W); Group 7 elements such as rhenium (Re) and manganese (Mn); Group 8 elements such as ruthenium (Ru) and osmium (Os); Group 9 elements such as rhodium (Rd) and iridium (Ir); Group 10 elements such as platinum (Pt) and palladium (Pd); Group 11 elements such as silver (Ag) and copper (Cu); Group 12 elements such as zinc (Zn), cadmium (Cd), and mercury (Hg); Group 13 elements, such as gallium (Ga), indium (In), thallium (Tl), and boron (B); Group 14 elements such as tin (Sn) and lead (Pb); and Group 15 elements such as phosphorus (P), bismuth (Bi), and antimony (Sb).

When the catalytic metal is cobalt, the promoter preferably comprises rhenium, ruthenium, platinum, palladium, boron, silver, or combinations thereof.

When the cobalt catalyst includes rhenium, the rhenium is preferably present in the catalyst in an amount between about 0.001 and about 5% rhenium by weight of the total catalyst composition, more preferably between about 0.01 and about 2 wt. % rhenium, still more preferably between about 0.2 and about 1 wt. % rhenium.

When the cobalt catalyst includes ruthenium, the ruthenium is preferably present in the catalyst in an amount between about 0.0001 and about 5% ruthenium by weight of the total catalyst composition, more preferably between about 0.001 and about 1 wt. % ruthenium, and still more preferably between about 0.01 and about 1 wt. % ruthenium.

When the cobalt catalyst includes platinum, the platinum is preferably present in the catalyst in an amount between about 0.00001 and about 5% by weight of the total catalyst composition, more preferably between about 0.0001 and about 1 wt. % platinum, and still more preferably between about 0.0005 and 1 wt. % platinum.

When the cobalt catalyst includes palladium, the palladium is preferably present in the catalyst in an amount between about 0.00001 and about 5% palladium by weight of the total catalyst composition, more preferably between about 0.0001 and about 2 wt. % palladium, and still more preferably between about 0.0005 and about 1 wt. % palladium.

When the cobalt catalyst includes silver, the catalyst preferably has a nominal composition including from about 0.05 to about 10% silver by weight of the total catalyst composition, more preferably from about 0.07 to about 7 wt. % silver, and still more preferably from about 0.1 to about 5 wt. % silver.

When the cobalt catalyst includes boron, the catalyst preferably has a nominal composition including from about 0.025 to about 2% boron by weight of the total catalyst composition, more preferably from about 0.05 to about 1.8 wt. % boron, and still more preferably from about 0.075 to about 1.5 wt. % boron.

By way of example and not limitation, when the catalytic metal is iron, suitable promoters include copper (Cu), potassium (K), silicon (Si), zirconium (Zr), silver (Ag), lithium (Li), sodium (Na), rubidium (Rb), cesium (Cs), magnesium (Mg), calcium (Ca), strontium (Sr), and barium (Ba). When the catalytic metal is iron, the promoter more preferably comprises potassium, copper, lithium, sodium, silver, magnesium, and combinations thereof. When the catalytic metal is iron, the catalyst may include potassium or lithium as a promoter; and alternatively or in combination, the catalyst may include copper or silver.

When the iron catalyst comprises lithium as a promoter, lithium is present in an amount preferably between about 0.05% and about 5% lithium by weight of the total catalyst composition; and more preferably, between about 0.5 wt. % and about 2 wt. % lithium.

When the iron catalyst comprises silver as a promoter, silver is present in an amount preferably between about 0.001% and about 5% silver by weight of the total catalyst composition; more preferably between about 0.001 wt. % and about 2 wt. % silver; and still more preferably between about 0.005 wt. % and about 1 wt. % silver.

When the iron catalyst comprises potassium as a promoter, potassium is present in an amount preferably between about 0.0001 wt. % and about 10 wt. % potassium to total weight of catalyst; more preferably, between about 0.0005 wt. % and about 1 wt. % potassium; and still more preferably, between about 0.0005 wt. % and about 0.5 wt. % potassium.

When the iron catalyst comprises calcium as a promoter, calcium is present in an amount preferably between about 0.001% and about 4% calcium by weight of the total catalyst composition; more preferably, between about 0.5 wt. % and about 3 wt. % calcium.

When the iron catalyst comprises copper as a promoter, copper is preferably present in an amount to provide a nominal catalyst composition including between about 0.1. % and about 10% copper by weight of the total catalyst composition.

By way of example and not limitation, when the catalytic metal is ruthenium, suitable promoters include rhenium. When the ruthenium catalyst includes rhenium, the rhenium is preferably present in the catalyst in an amount between about 0.001 and about 1% rhenium by weight of the total catalyst composition, more preferably between about 0.01 and about 0.5 wt. % rhenium, still more preferably between about 0.05 and about 0.5 wt. % rhenium.

As used herein, a nominal composition is preferably a composition specified with respect to an active catalyst. The active catalyst may be either fresh or regenerated. The nominal composition may be determined by experimental elemental analysis of an active catalyst. Alternatively, the nominal composition may be determined by numerical analysis from the known amounts of catalytic metal, promoter, and support used to make the catalyst. It will be understood that the nominal composition as determined by these two methods will typically agree within conventional accuracy.

Further, as used herein, it will be understood that each of the ranges, such as of ratio or weight %, herein is inclusive of its lower and upper values.

Catalyst Preparation

The present catalysts may be prepared by any of the methods known to those skilled in the art. By way of illustration and not limitation, methods of preparing a supported catalyst include impregnating a catalyst material onto the support, extruding the support material together with catalyst material to prepare catalyst extrudates, spray-drying the catalyst material and the support from a solution containing both, and/or precipitating the catalyst material onto a support. Accordingly, the supported catalysts of the present invention may be used in the form of powders, particles, pellets, monoliths, honeycombs, packed beds, foams, and aerogels. The catalyst material may include any one or combination of a catalytic metal, a precursor compound of a catalytic metal, a promoter, and a precursor compound of a promoter.

The most preferred method of preparation may vary among those skilled in the art depending, for example, on the desired catalyst particle size. Those skilled in the art are able to select the most suitable method for a given set of requirements.

One method of preparing a catalyst by impregnating a catalyst material onto a support includes impregnating the support with a solution containing the catalyst material. Suitable solvents include water and organic solvents (e.g., toluene, methanol, ethanol, and the like). Those skilled in the art will be able to select the most suitable solvent for a given catalyst material.

The catalyst material may be in the form of a salt of a catalytic metal or promoter element. Thus, one method of preparing supported metal catalyst is by incipient wetness impregnation of the support with a solution of a soluble metal salt. Incipient wetness impregnation preferably proceeds by solution of a cobalt compound in a minimal amount of solvent sufficient to fill the pores of the support. Alternatively, the catalyst material may be in the form of a zero valent compound of a catalytic metal or promoter element. Thus, another preferred method is to impregnate the support with a solution of zero valent metal such as cobalt carbonyl (e.g., $Co_2(CO)_8$, $Co_4(CO)_{12}$) or the like. Another method of preparing a catalyst by impregnating a catalyst material onto a support includes impregnating the support with a molten salt of a catalytic metal or promoter. Thus, another method includes preparing the supported metal catalyst from a molten metal salt. One preferred method is to impregnate the support with a molten metal nitrate (e.g., $Co(NO_3)_2 \cdot 6H_2O$). When a catalyst material is impregnated as a precursor of the material, e.g. a salt or zero valent compound, those skilled in the art will be able to selected the most suitable precursor.

Multiple steps of impregnation may be desirable in order to achieve the desired amount of catalytic material loading. Further, a promoter compound may be impregnated separately from any catalytic metal, e.g. in a separate solution. Alternatively, a promoter compound may be impregnated simultaneously with, e.g. in the same solution as, at least a portion of the catalytic metal.

The impregnated support is preferably treated to form a treated impregnated support. The treatment may include drying the impregnated support. Drying the impregnated support preferably occurs at a temperature between about 80 and about 150° C. Typically, drying proceeds for from about 0.5 to about 24 hours at a pressure of from about 0 to about 10 atm, more preferably from about 1 to about 5 atm, still more preferably at about 1 atm.

Alternatively, or in combination, treating an impregnated support to form a treated impregnated support may include calcining the impregnated support. The calcination preferably achieves oxidation of any impregnated compound or salt of a supported material to an oxide compound of the supported material. When the catalytic metal includes cobalt, the calcination preferably proceeds at a temperature of at least about 200° C. Further, the calcination preferably proceeds at a temperature less than the temperature at which loss of support surface area is appreciable. It is believed that, at temperatures above 900° C., loss of support surface area is appreciable. When the catalytic metal includes cobalt, the calcination preferably proceeds at a temperature between about 200° C. and about 800° C., more preferably between about 275° C. and about 425° C., still more preferably between about 300° C. and about 425° C. Typically, calcining proceeds from about 0.5 to about 24 hours at a pressure of from about 0 to about 10 atm, more preferably between about 1 to about 5 atm, still more preferably at about 1 atm.

The impregnation of catalytic metal and any optional promoter on a support may proceed by multistep impregnation, such as by two, three, or four impregnation steps. Each impregnation step may include impregnation of any one or combination of catalytic metal and promoter. Each impregnation step may be followed by any of the above-described treatments of the impregnated support. In particular, each step of impregnating the support to form an impregnated support may be followed by treating the impregnated support to form a treated impregnated support. Thus, a multi-step impregnation may include multiple steps of drying and/or calcination. Each subsequent step of drying may proceed at a different temperature from any earlier steps of drying. Further, each subsequent step of calcination may proceed at a different temperature from any earlier steps of calcination. By way of example and not limitation, a multi-step impregnation may include calcining the support at a first temperature that is higher than the temperature for subsequent calcinations.

Typically, at least a portion of the metal(s) of the catalytic metal component of the catalysts of the present invention is present in a reduced state (i.e., in the metallic state). Therefore, it may be advantageous to activate the catalyst prior to use by a reduction treatment in the presence of a reducing gas at an elevated temperature. The reducing gas preferably includes hydrogen. Typically, the catalyst is treated with hydrogen or a hydrogen-rich gas at a temperature in the range of from about 75° C. to about 500° C., for from about 0.5 to about 50 hours at a pressure of from about 1 to about 75 atm. Pure hydrogen may be used in the reduction treatment, as may a mixture of hydrogen and an inert gas such as nitrogen, or a mixture of hydrogen and other gases as are known in the art, such as carbon monoxide and carbon dioxide. Reduction with pure hydrogen and reduction with a mixture of hydrogen and carbon monoxide are preferred. The amount of hydrogen may range from about 1% to about 100% by volume.

Fischer-Tropsch Operation

A process for producing hydrocarbons preferably includes contacting a feed stream that includes carbon monoxide and hydrogen with the present catalyst. Alternatively or in combination, a process for producing hydrocarbons includes contacting a feed stream that includes carbon monoxide and hydrogen with a catalyst in a reaction zone so as to produce hydrocarbons, wherein the catalyst is a catalyst made according to the present method.

The feed gas charged to the process for producing hydrocarbons includes hydrogen ($H_2$), or a hydrogen source, and carbon monoxide (CO). Mixtures comprising $H_2$ and CO, which are suitable as a feedstock for conversion to hydrocarbons according to the process of this invention, can be obtained from light hydrocarbons such as methane by means of steam reforming, partial oxidation, or other processes known in the art. Preferably, the hydrogen is provided by free hydrogen, although some Fischer-Tropsch catalysts have sufficient water gas shift activity to convert some water and carbon monoxide to hydrogen and carbon dioxide, and thus produces hydrogen for use in the Fischer-Tropsch process. It is preferred that the molar ratio of hydrogen to carbon monoxide in the feed be greater than about 0.5:1 (e.g., from about 0.67 to about 2.5). Preferably, when cobalt, nickel, and/or ruthenium catalysts are used, the feed gas stream contains hydrogen and carbon monoxide in a molar ratio of from about 1.6:1 to about 2.3:1. When iron catalysts are used, the feed gas stream contains hydrogen and carbon monoxide in a molar ratio of from about 1.4:1 to about 2.2:1. The feed gas may also contain carbon dioxide. The feed gas stream preferably contains only a low concentration of compounds or elements that have a deleterious effect on the catalyst, such as poisons. For example, the feed gas may need to be pretreated to ensure that it contains low concentrations of sulfur or nitrogen compounds such as hydrogen sulfide, ammonia, hydrogen cyanide, and carbonyl sulfides.

The feed gas is contacted with the catalyst in a reaction zone. Mechanical arrangements of conventional design may be employed as the reaction zone including, for example, plug flow, continuous stirred tank, fixed bed, fluidized bed, slurry phase, slurry bubble column, reactive distillation column, or ebulliating bed reactors, among others, may be used. Examples of suitable slurry bubble column reactors are described in co-owned, published U.S. Patent Applications 2003-0027875 and 2003-0114543. Plug flow, fluidized bed, reactive distillation, ebulliating bed, and continuous stirred tank reactors have been delineated in "Chemical Reaction Engineering," by Octave Levenspiel, and are known in the art, as are slurry bubble column. The size and physical form of the catalyst may vary, depending on the reactor in which it is to be used.

When the reaction zone includes a slurry bubble column, the column preferably includes a three-phase slurry. Further, a process for producing hydrocarbons by contacting a feed stream including carbon monoxide and hydrogen with a catalyst in a slurry bubble column preferably includes dispersing the particles of the catalyst in a liquid phase comprising the hydrocarbons so as to form a two-phase slurry; and dispersing the hydrogen and carbon monoxide in the two-phase slurry so as to form the three-phase slurry. Further, the slurry bubble column preferably includes a vertical reactor, and dispersal preferably includes injection and distribution in the bottom half of the reactor.

The Fischer-Tropsch process is typically run in a continuous mode. In this mode, the gas hourly space velocity through the reaction zone may range from about 50 to about 10,000 $hr^{-1}$, preferably from about 300 $hr^{-1}$ to about 2,000 $hr^{-1}$. The gas hourly space velocity is defined as the volume of reactants per time per reaction zone volume. The volume of reactant gases is at standard conditions of pressure (101 kPa) and temperature (0° C.). The reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated at conversion promoting conditions at temperatures from about 190° C. to about 260° C.; more preferably from about 200°

C. to about 230° C. The reaction zone pressure is typically in the range of from about 80 psia (552 kPa) to about 1,000 psia (6,895 kPa), more preferably from about 80 psia (552 kPa) to about 800 psia (5,515 kPa), and still more preferably from about 140 psia (965 kPa) to about 750 psia (5,170 kPa). Most preferably, the reaction zone pressure is from about 250 psia (1,720 kPa) to about 650 psia (4,480 kPa).

The products resulting from the process will have a great range of molecular weights. Typically, the carbon number range of the product hydrocarbons will start at methane and continue to about 50 to 100 carbons or more per molecule as measured by current analytical techniques. The process is particularly useful for making hydrocarbons having five or more carbon atoms, especially when the above-referenced preferred space velocity, temperature and pressure ranges are employed.

The wide range of hydrocarbons produced in the reaction zone will typically afford liquid phase products at the reaction zone operating conditions. Therefore, the effluent stream of the reaction zone will often be a mixed phase stream including liquid and gas phase products. The effluent gaseous stream of the reaction zone may be cooled to condense additional amounts of hydrocarbons and passed into a vapor-liquid separation zone separating the liquid and vapor phase products. The gaseous material may be passed into a second stage of cooling for recovery of additional hydrocarbons. The liquid material from the reaction zone together with any liquid from a subsequent separation zone may be fed into a fractionation column. Typically, a stripping column is employed first to remove light hydrocarbons such as propane and butane. The remaining hydrocarbons may be passed into a fractionation column where they are separated by boiling point range into products such as naphtha, kerosene and fuel oils. Hydrocarbons recovered from the reaction zone and having a boiling point above that of the desired products may be passed into conventional processing equipment such as a hydrocracking zone in order to reduce their molecular weight down to desired products such as middle distillates and gasoline. In some embodiments, the liquid material from the reaction zone, in part or in totality, together with any liquid from a subsequent separation zone may be fed into a hydroprocessing unit prior to being fractionated to produce a hydroprocessed product that is then sent to a fractionation column to produce at least a diesel distillate, wherein the diesel has a cetane number greater than 55. Hydroprocessing may comprise hydrotreatment, hydrocracking, hydroisomerization, dewaxing, or any combination thereof. In some embodiments, the hydroprocessing comprises a hydrotreatment of the liquid material from the reaction zone with optionally any liquid from a subsequent separation zone to reduce the olefin content of the hydrocarbon product liquid, hence of the diesel fraction therefrom. In other embodiments, hydroprocessing comprises hydrocracking of the bottoms of the fractionation column (comprising mainly waxy hydrocarbons) zone to convert heavy hydrocarbons to lighter hydrocarbons. In yet other embodiments, hydroprocessing comprises hydroisomerization of a fraction of the liquid material from the reaction zone to convert hydrocarbons to more branched hydrocarbons.

The gas phase recovered from the reactor zone effluent stream after hydrocarbon recovery may be partially recycled if it contains a sufficient quantity of hydrogen and/or carbon monoxide.

Without further elaboration, it is believed that one skilled in the art can, using the description herein, utilize the present invention to its fullest extent. The following embodiments are to be construed as illustrative, and not as constraining the scope of the present invention in any way whatsoever.

EXAMPLE

With the invention having been generally described, the following EXAMPLES are given as particular embodiments of the invention and to demonstrate the practice and advantages hereof. It is understood that the examples are given by way of illustration and are not intended to limit the specification or the claims to follow in any manner.

Example 1

Preparation of Catalyst Support

Gel 1 Preparation

Silica/alumina gel with a silica-to-alumina molar ratio of 70:1 was prepared by co-precipitating sodium aluminate and sodium silicate with the addition of diluted nitric acid. A hydrogel was obtained within 30 minutes, and the gelation pH was 10.15. The total weight of the gel was 2,210 g.

Gel 2 Preparation

Silica/alumina gel with a silica-to-alumina molar ratio of 70:1 was prepared by co-precipitating sodium aluminate and sodium silicate with the addition of diluted nitric acid. A hydrogel was obtained within 30 minutes, and the gelation pH was 10.85. Because the gelation pH of the second gel is greater than that of the first gel, the second gel should have a greater average pore size than the first gel. The total weight of the gel was 1,950 g.

Support Preparation

Silica/alumina support having a bimodal pore size distribution with a silica-to-alumina molar ratio of 70:1 was prepared by mixing 2,210 g of Gel 1 and 487.5 g of Gel 2, which corresponds to about a weight fraction of 81% for Gel 1 and 19% for Gel 2 in the gel mixture. After mixing the gels, the gel mixture was aged for three days at room temperature. Thereafter, an ion exchange technique was performed with a 1.0 Molar ammonium nitrate solution to replace the sodium cations (i.e., $Na^+$) with the ammonium cations (i.e., $NH_4^+$). Next, the hydrogel was washed with deionized water to remove most of the spent ion exchange solution comprising the displaced sodium cations. Finally, the gel was dried at 110° C. overnight (i.e., for about 16 hours) and calcined in air at 550° C. for three hours. The resulting sample was then crushed and sieved before use to obtain an average particle size of about 90 microns.

Support Characterization

The BET surface area, average pore volume and average pore diameter were measured by the BJH desorption method using $N_2$ as the adsorptive material of catalysts and supports. Surface area and pore size distribution were obtained on a Micromeritics TriStar 3000 analyzer after degassing the sample at 190° C. in flowing nitrogen for five hours. Surface area was determined by taking ten points in the nitrogen adsorption isotherm between 0.05 and 0.3 relative pressure and by calculating the surface area by the standard BET procedure. Pore size distribution was determined from a minimum of 30 points in the nitrogen desorption isotherm and calculated using the BJH model for cylindrical pores. The instrument control and calculations were performed using the TriStar software and are consistent with ASTM D3663-99 entitled "Surface Area of Catalysts and Catalyst Carriers," ASTM D4222-98 entitled "Determination of Nitrogen Adsorption and Desorption Isotherms of Catalysts by Static Volumetric Measurements," and ASTM D4641-94 entitled "Calculation of Pore Size Distributions of Catalysts from Nitrogen Desorption Isotherms." The initial surface area (A) of the catalyst was determined as the surface area of the catalyst structure prior to contact of reactant gas. The average pore volume (V) of the catalyst ($N_2$ as adsorptive material) was measured and calculated using the method described above. Average pore size (diameter) was calculated as 4V/A.

Figure 1:
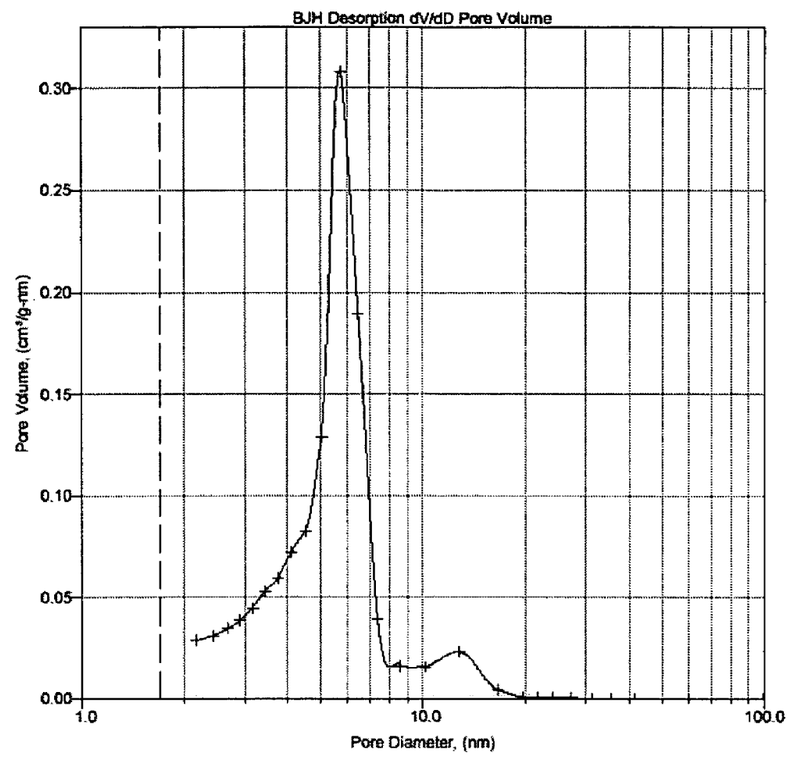

The BET surface area of this support was 449 $m^2$/g, and the total pore volume was 0.80 cc/g. The pore size distribution of the bimodal silica/alumina support Example 1 is shown on the drawing. The first mode (corresponding to the first maximum of the pore volume versus pore diameter) was about 5.8 nm, and the second mode (corresponding to the second maximum of the pore volume versus pore diameter) was about 13.0 nm. There were two ranges of pore sizes. The first range that comprised the first mode, had an average pore size between about 4 nm and about 10 nm, and the second range, which comprised the second mode, had an average pore size between about 10 nm and about 20 nm.

Example 2

Catalyst Preparation and Testing

A cobalt catalyst was made by impregnating bimodal silica/alumina support Example 1. A sample of the silica-alumina support Example 1 was impregnated with an aqueous solution of cobalt nitrate $Co(NO)_3 6H_2O$ and platinum (II) acetylacetonate using an appropriate quantity for incipient wetness. The catalyst precursor was then dried in air at 120° C. for 2 hours and calcined in air at 240° C. for 4 hours. The finished catalyst contained 20 wt. % cobalt (Co) and 0.014 wt. % platinum (Pt), with the remainder being the silica-alumina support.

Fixed Bed Testing

The catalyst was tested in a fixed bed reactor. The conditions included a temperature of 220° C., a pressure of 350 psig, a hydrogen-to-carbon monoxide molar ratio of 2, and a space velocity of 6 NL/h/kg catalyst. The time on stream (TOS), mole percent CO converted to hydrocarbons (CO Conv.), mole percent methane in the hydrocarbons ($C_1$), production of $C_{5+}$ hydrocarbons ($C_{5+}$ prod.) in gram per hour per kilogram of catalyst, and Schultz-Flory probability ($\alpha$), which is an estimation of hydrocarbon product selectivity, were monitored by conventional methods. Results are reported in Table 1.

TABLE 1

| Catalyst Composition | TOS, h | CO Conv. % | $C_1$ wt % | $C_{5+}$ prod. g/h/kgcat | $\alpha$ |
|---|---|---|---|---|---|
| EXAMPLE 2 | 24.0 | 62.5 | 11.1 | 591 | 0.88 |
| 20% Co/0.014% Pt/ | 48.8 | 57.6 | 11.5 | 543 | 0.87 |
| $SiO_2$—$Al_2O_3$ | 74.5 | 57.4 | 11.5 | 533 | 0.86 |
|  | 98.0 | 57.7 | 11.1 | 546 | 0.92 |

Slurry Bed Testing

A continuously stirred tank reactor was loaded with 5.2 g of catalyst. The initial conditions for the reactor included a pressure of 350 psig and a temperature of 225° C. The feed gas was initially set to 28.57 standard liters per hour (slph) with a percent composition of 66.6 vol % $H_2$ and 33.40 vol % CO for a $H_2$:CO molar ratio of 1.99 and about a weight hourly space velocity of 5.5 standard liters per hour per gram of catalyst. About 300 g of POLYWAX® P.W.3000 from Baker Petrolite (Sugar Land, Tex.) was added to the reactor. The catalyst was pretreated in the reactor with $H_2$ at 280° C. for 16 hours. The time on stream (TOS), mole percent CO converted to hydrocarbons (CO Conv.), weight percent methane in the hydrocarbons ($C_1$), and productivity of hydrocarbon with 5 carbon atoms or more ($C_{5+}$ Prod.) were monitored by conventional methods. The results are shown in Table 2.

TABLE 2

| Ex. Catalyst Composition | TOS H | CO Conv. % | $C_1$ wt % | $C_{5+}$ Prod. g/h/kgcat |
|---|---|---|---|---|
| 2  20% Co/0.014% Pt/ | 20.8 | 56.8 | 7.3 | 660 |
| $SiO_2$—$Al_2O_3$ | 44.0 | 53.3 | 9.3 | 620 |
|  | 68.0 | 46.2 | 11.2 | 540 |
|  | 164.0 | 45.7 | 12.1 | 530 |
|  | 188.0 | 41.6 | 13.3 | 490 |
|  | 212.5 | 34.9 | 16.7 | 410 |
|  | 236.0 | 31.9 | 18.5 | 370 |

Although the present invention and its advantages have been described in detail, it should be understood that various changes, substitutions and alterations may be made herein without departing from the spirit and scope of the invention as defined by the appended claims.

We claim:

1. A process for producing hydrocarbons, comprising contacting a feed stream comprising carbon monoxide and hydrogen with a catalyst so as to convert at least a portion of the carbon monoxide to the hydrocarbons comprising hydrocarbons with at least 5 carbon atoms per hydrocarbon molecule ($C_{5+}$ hydrocarbons), wherein the catalyst comprises a Fischer-Tropsch catalytic metal and a support comprising an amorphous silica-alumina having a bimodal pore size-distribution comprising a first mode between about 4 nm and about 10 nm and a second mode between about 10 nm and about 20 nm, and further wherein the productivity in $C_{5+}$ hydrocarbons is from 370 g $C_{5+}$/hr/$kg_{cat}$ to 660 g $C_{5+}$/hr/$kg_{cat}$.

2. The process according to claim 1 wherein the distribution has a first mode between about 5 nm and about 9 nm, and a second mode between about 12 nm and about 17 nm.

3. The process according to claim 1 wherein the first mode and the second mode differ by at least about 2 nm.

4. The process according to claim 1 wherein the bimodal pore size-distribution has a range of pore sizes from about 4 nm to about 20 nm.

5. The process according to claim 1 wherein the bimodal pore size-distribution has a first range of pores with an average pore size from about 4 nm to about 10 nm, said first range comprising the first mode, and further wherein the bimodal pore size-distribution has a second range of pores with an average pore size from about 10 nm to about 20 nm, said second range comprising the second mode.

6. The process according to claim 5 wherein the first mode and the second mode differ by at least about 2 nm.

7. The process according to claim 1 wherein the bimodal pore size-distribution has a first range of pores comprising the first mode and a second range of pores comprising the second mode, said first range comprising from about 70% to about 90% of the pores and an average pore size between about 4 nm and about 10 nm, and said second range comprising from about 10% to about 30% of the pores and an average pore size between about 10 nm and about 20 nm.

8. The process according to claim 1 wherein the support has a pore volume of at least about 0.7 cc/g.

9. The process according to claim 1 wherein the support has a surface area of at least about 260 m²/g.

10. The process according to claim 1 wherein the support has a surface area of at least about 300 m²/g.

11. The process according to claim 1 wherein the support has a molar ratio of silica to alumina between about 3:1 and about 1,000:1.

12. The process according to claim 1 wherein the support has a molar ratio of silica to alumina between about 30:1 and about 500:1.

13. The process according to claim 1 wherein the support has a molar ratio of silica to alumina between about 40:1 and about 400:1.

14. The process according to claim 1 wherein the support has a surface area greater than 260 m²/g.

15. The process according to claim 1 wherein the support comprises less than about 0.05 cc/g of pore volume in pores having a diameter less than about 4 nm.

16. The process according to claim 1 wherein the support comprises at least about 0.7 cc/g of pore volume in pores having a diameter from about 4 nm to about 20 nm.

17. The process according to claim 1 wherein the catalytic metal is selected from the group consisting of cobalt, iron, ruthenium, and combinations thereof.

18. The process according to claim 1 wherein the catalytic metal is cobalt.

19. The process according to claim 1 wherein the hydrocarbons comprise a fuel selected from the list consisting of gasoline, heating oil, jet fuel, diesel fuel, and kerosene.

20. The process according to claim 1 wherein the carbon monoxide conversion is between 31.9% and 62.5%.

21. The process according to claim 1 wherein the process comprises a Schultz-Flory probability (α value) between 0.88 and 0.92.

22. A process for producing hydrocarbons, comprising contacting a feed stream comprising carbon monoxide and hydrogen with a catalyst so as to convert at least a portion of the carbon monoxide to the hydrocarbons comprising hydrocarbons with at least 5 carbon atoms per hydrocarbon molecule ($C_{5+}$ hydrocarbons) wherein the catalyst comprises a Fiseher-Tropsch catalytic metal dispersed on an amorphous silica-alumina having a bimodal pore size-distribution comprising a first mode between about 4 nm and about 10 nm and a second mode between about 10 nm and about 20 nm, said amorphous silica-alumina comprising a pore volume greater than about 0.7 cc/g and further wherein the productivity in $C_{5+}$ hydrocarbons is from 370 g $C_{5+}$/hr/$kg_{cat}$ to 660 g $C_{5+}$/hr/$kg_{cat}$.

23. The process according to claim 22 wherein the support has a surface area greater than 260 m²/g.

24. The process according to claim 22 wherein the first mode and the second mode differ by at least about 2 nm.

25. The process according to claim 22 wherein the distribution has a first mode between about 5 nm and about 9 nm, and a second mode between about 12 nm and about 17 nm.

26. The process according to claim 22 wherein the bimodal pore size-distribution has a first range of pores comprising the first mode and a second range of pores comprising the second mode, said first range comprising from about 70% to about 90% of the pores and an average pore size between about 4 nm and about 10 nm, and said second range comprising from about 10% to about 30% of the pores and an average pore size between about 10 nm and about 20 nm.

27. The process according to claim 22 wherein the support comprises less than about 0.05 cc/g of pore volume in pores having a diameter less than about 4 nm.

28. The process according to claim 22 wherein the support comprises at least about 0.7 cc/g of pore volume in pores having a diameter from about 4 nm to about 20 nm.

29. The process according to claim 22 wherein the hydrocarbons comprise a fuel selected from the list consisting of gasoline, heating oil, jet fuel, diesel fuel, and kerosene.

30. The process according to claim 22 wherein the support has a molar ratio of silica to alumina between about 3:1 and about 1,000:1.

* * * * *